(12) United States Patent
Duyck et al.

(10) Patent No.: US 8,950,706 B2
(45) Date of Patent: Feb. 10, 2015

(54) AIRCRAFT FLIGHT CONTROL SYSTEM COMPRISING A CONNECTING ROD PROVIDED WITH A SENSOR

(75) Inventors: Arnaud Duyck, Paris (FR); Bruno Tilly, Paris (FR); François Guillot, Paris (FR); Jérôme Piaton, Paris (FR)

(73) Assignee: Sagem Defense Securite, Paris (FR)

( * ) Notice: Subject to any disclaimer, the term of this patent is extended or adjusted under 35 U.S.C. 154(b) by 404 days.

(21) Appl. No.: 13/260,596

(22) PCT Filed: Mar. 30, 2010

(86) PCT No.: PCT/EP2010/054224
§ 371 (c)(1),
(2), (4) Date: Sep. 27, 2011

(87) PCT Pub. No.: WO2010/112513
PCT Pub. Date: Oct. 7, 2010

(65) Prior Publication Data
US 2012/0025014 A1 Feb. 2, 2012

(30) Foreign Application Priority Data

Mar. 30, 2009 (FR) ...................................... 09 01527

(51) Int. Cl.
*B64C 9/00* (2006.01)
*B64C 13/00* (2006.01)
(Continued)

(52) U.S. Cl.
CPC ................. *B64C 13/30* (2013.01); *B64C 13/08* (2013.01); *B64C 13/46* (2013.01); *G01L 5/101* (2013.01)
USPC .......... 244/99.3; 244/220; 244/234; 244/236; 73/862.392; 73/862.621; 73/862.68

(58) Field of Classification Search
CPC ...... B64C 13/28; B64C 13/50; B64C 13/503; B64C 13/00; B64C 13/40; B64C 13/12; B64C 13/36; B64C 19/00; B64C 2013/506; B64C 2027/7272; B64C 25/24; B64C 27/68; B64C 3/20
USPC .......... 244/99.3, 99.2, 228, 236; 74/519, 523, 74/579 R
See application file for complete search history.

(56) References Cited

U.S. PATENT DOCUMENTS 3,173,631 A * 3/1965 Hendrickson .................. 244/230
3,578,267 A * 5/1971 Kazmarek ..................... 244/197
(Continued)

FOREIGN PATENT DOCUMENTS

DE 103 03 706 A1 4/2005
EP 1 065 487 A2 1/2001
(Continued)

*Primary Examiner* — John W Eldred
*Assistant Examiner* — George Andonyan
(74) *Attorney, Agent, or Firm* — Muncy, Geissler, Olds & Lowe, P.C.

(57) ABSTRACT

A control system, in particular an aircraft flight control system, having a linkage with a force-transmission link (3), the link having a body (5) having at least one end housing (8) slidably receiving a coupling rod (9) for coupling the link to an adjacent element of the linkage, the housing being closed by an elastically-deformable test member (10) through which the rod passes and that has an inner periphery fastened to the rod and an outer periphery fastened to a wall defining the end housing, and the end housing receiving at least one sensor (11) for sensing relative movement between the rod and the body.

7 Claims, 1 Drawing Sheet

(51) Int. Cl.
 *B64C 13/30* (2006.01)
 *B64C 13/08* (2006.01)
 *B64C 13/46* (2006.01)
 *G01L 5/10* (2006.01)

(56) References Cited

U.S. PATENT DOCUMENTS

| | | | |
|---|---|---|---|
| 4,607,202 A | * | 8/1986 | Koenig ......................... 318/628 |
| 4,947,701 A | * | 8/1990 | Hegg ........................ 74/471 XY |
| 5,522,568 A | | 6/1996 | Kamen |
| 5,908,177 A | * | 6/1999 | Tanaka .......................... 244/223 |
| 6,830,223 B1 | * | 12/2004 | Moore .......................... 244/220 |
| 2005/0178215 A1 | | 8/2005 | Mayer et al. |
| 2007/0034023 A1 | | 2/2007 | Browning |

FOREIGN PATENT DOCUMENTS

| EP | 2 067 697 A1 | 6/2009 |
|---|---|---|
| WO | WO 02/40345 A1 | 5/2002 |

* cited by examiner

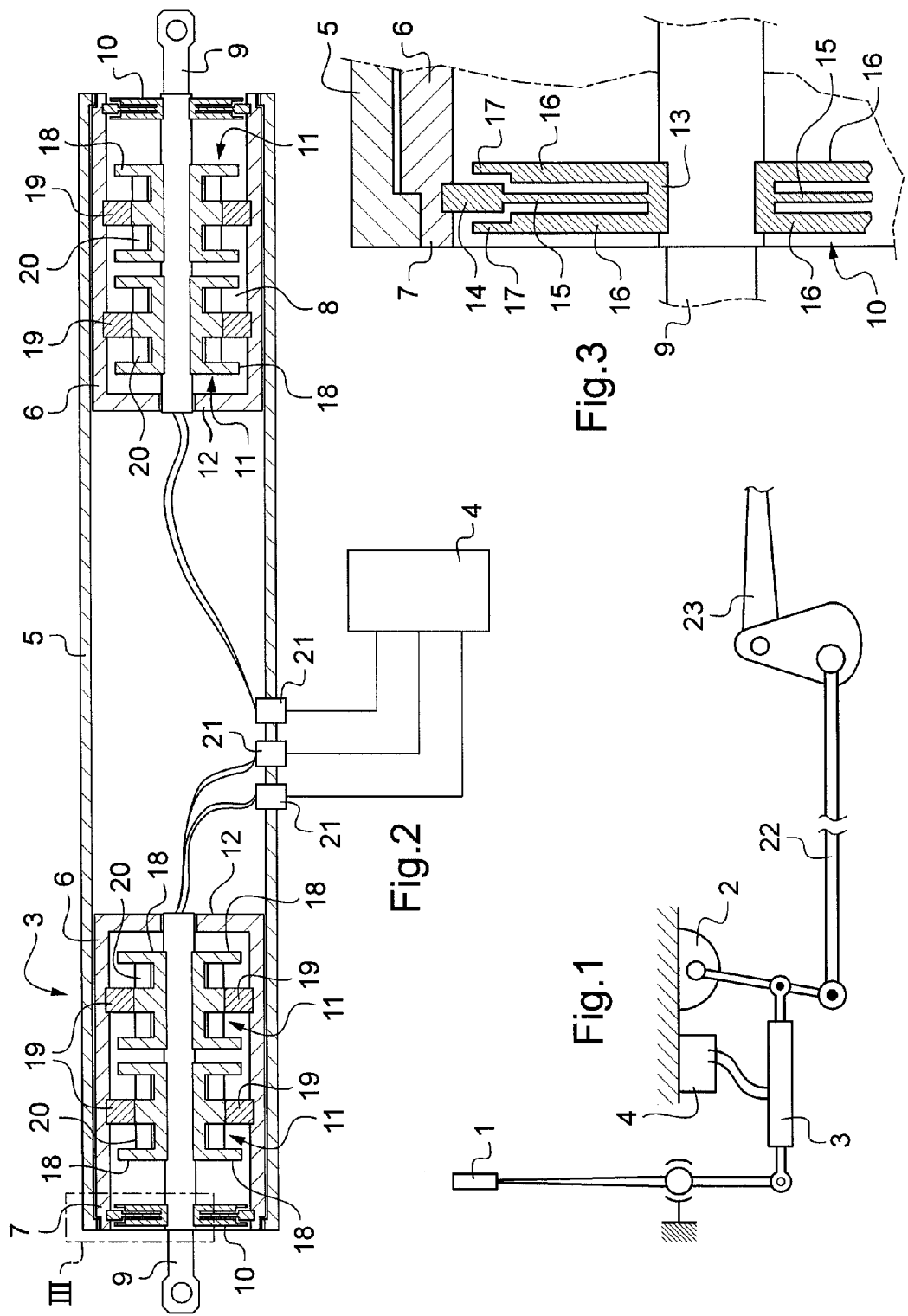

AIRCRAFT FLIGHT CONTROL SYSTEM COMPRISING A CONNECTING ROD PROVIDED WITH A SENSOR

FIELD OF THE INVENTION

The present invention relates to a control system, e.g. an aircraft flight control system, e.g. for controlling control surfaces of the aircraft.

BACKGROUND OF THE INVENTION

Such a control system comprises a linkage having elements that are arranged and connected together in such a manner as to transmit movements from a flight control, such as a control stick, to the control surfaces. By way of example, one of the transmission elements is a forced-transmission link for actuating a hydraulic power assistance servo-valve. The linkage also includes a spring enabling force to be returned that can be perceived by the pilot via the control stick and that is proportional to the force exerted by the pilot on the stick.

Proposals have been made to use an electric motor to act simultaneously to provide trim, and to replace the servo-valve and the spring. With the servo-valve being eliminated, the motor must then provide the necessary power assistance function. For these purposes, control of the electric motor requires measurements to be available of the forces exerted by the pilot on the control stick.

One way in which such measurements can be obtained is to install strain gauges on the transmission link in order to measure the forces exerted thereon. Nevertheless, such strain gauges need to be stuck directly onto the link in order to perform their function and that kind of fastening is not sufficiently reliable and durable for certain applications, in particular in aviation.

It is also known to provide elastically-deformable zones in the body of the link that allow two portions of the body of the link to move relative to each other, which portions are associated with a movement detector element. The structure of known devices does not make it possible in simple and effective manner to sense external stresses.

OBJECT AND SUMMARY OF THE INVENTION

An object of the invention is to remedy the above-mentioned drawbacks, at least in part.

To this end, the invention provides a control system, in particular an aircraft flight control system, comprising a linkage with a force-transmission link, the link comprising a body having at least one end housing slidably receiving a coupling rod for coupling the link to an adjacent element of the linkage, the housing being closed by an elastically-deformable test member through which the rod passes and that has an inner periphery fastened to the rod and an outer periphery fastened to a wall defining the end housing, and the end housing receiving at least one sensor for sensing relative movement between the rod and the body.

The test member is an element presenting stiffness that makes it possible to associate the amplitude of the movement of the rod (relative to the body) with the force exerted on the rod. The test member performs a second function, that of closing the housing receiving the sensor, thereby limiting any contact between the sensor and ambient moisture or dust or other dirt that, on accumulating, might lead to the sensor malfunctioning.

Preferably, the link has two end housings, each receiving a sensor and a coupling rod and each closed by a respective test member.

Redundancy is thus provided among the measurement elements so as to limit any risk of complete failure of the measurement system.

In a particular embodiment, the test member comprises an inner ring coaxially inside an outer ring and connected together by an elastically deformable annular web, the inner ring being mounted on the rod and the outer ring being mounted in the wall of the housing.

The test member is thus of simple structure.

Preferably, the test member includes at least one rigid annular wall extending parallel to the web and having an outer periphery forming a lateral abutment against relative movement between the outer ring and the inner ring, and, advantageously, the test member has two rigid annular walls extending on either side of the web.

Thus, if the web breaks, then the abutments ensure that force continues to be transmitted, thereby enabling the link to perform its function by maintaining continuity of the linkage.

According to a particular characteristic, the wall of the housing forms part of a cartridge that is received with radial clearance in a cavity formed in one of the ends of the body, and that has one end fastened to the body in the vicinity of the test member.

The force exerted on the test member by the rod is transmitted to the body via the cartridge via its fastened end, with the remainder of the cartridge not being subjected to this force. As a result the sensor is protected from this force, thereby limiting the mechanical stresses to which it is subjected. Stresses associated with assembly and with differential expansion are also limited.

BRIEF DESCRIPTION OF THE DRAWINGS

Other characteristics and advantages of the invention appear on reading the following description of a particular, non-limiting embodiment of the invention.

Reference is made to the accompanying drawing, in which:

FIG. 1 is a diagrammatic view of the linkage of the control system in accordance with the invention;

FIG. 2 is a diagrammatic longitudinal section view of the link of the invention; and FIG. 3 is an enlarged view of zone III in FIG. 2.

MORE DETAILED DESCRIPTION

With reference to the figures, the control system in accordance with the invention comprises a force linkage including a control stick 1 connected to an electric motor 2 by a link 3.

The electric motor 2 acts directly or indirectly (e.g. via rodding) to actuate at least one control surface 23, and it is connected to a control unit 4. The control unit 4 is arranged and programmed to control the motor 2 in such a manner that it provides the functions of assisting in actuating the control surfaces, of returning force to the pilot, and of providing trim to enable the neutral position of the control stick to be adjusted (i.e. the position in which the stick remains when the pilot is not acting on it). The rodding, the control unit 4, and the electric motor 3 are themselves known and they are not described in greater detail herein.

The link 3 comprises a tubular body 5 having two end portions, each of which has a respective cartridge 6 mounted therein. Each cartridge 6 is defined by a cylindrical wall and it possesses an end 7 that is fastened to the edge of the corresponding end portion of the body 5, while the remainder of the cartridge 6 is received with radial clearance inside the body 5. The cartridge 6 is fastened in such a manner as to be prevented from moving axially and radially relative to the body 5. This fastening may be made in optionally releasable manner, e.g. by screw fastening, wedging, welding, crimping, bolting, . . . . Each cartridge 6 defines a housing 8 that receives a coupling rod 9, a test member 10, and sensors 11.

Each coupling rod 9 is slidably received in the housing 8 of the cartridge 6 and in this example possesses one end fitted with an eyelet for coupling to an adjacent element of the linkage and one end that is smooth and slidably received in a guide bearing formed in an end wall 12 of the cartridge 6.

Each test member 10 comprises an inner ring 13 located coaxially inside an outer ring 14, the rings being connected together by an annular web 15 that is elastically deformable. The inner ring 13 is fastened on the coupling rod 9, and the outer ring 14 is fastened in the end 7 of the cartridge 6 such that each test member closes the housing 8 of the cartridge 6 in which it is mounted. The inner and outer rings 13 and 14 are fastened in such a manner as to be prevented from moving axially relative to the coupling rod 9 and to the cartridge 6, respectively. This fastening may be implemented in optionally releasable manner, e.g. by screw fastening, wedging, welding, crimping, bolting, . . . . Additional sealing means may also be provided between firstly the inner and outer rings 13 and 14 and secondly the coupling rod 9 and the cartridge 6, respectively, depending on the quality of sealing that is desired.

The web 15 is dimensioned so as to transmit an axial force from the outer ring 14 to the inner ring 13 and vice versa in such a manner that a force of given value gives rise to a predetermined relative movement between the inner ring 13 and the outer ring 14. The test member thus serves to introduce a constant and predetermined correspondence between the relative movement and the force that gave rise thereto.

Each test member 10 also includes two annular and rigid side walls 16 that extend parallel to the web 15 on either side thereof, the side walls having respective inner peripheries secured to the inner ring 13 and outer peripheries 17 constituting lateral abutments for the movement of the outer ring 14 relative to the inner ring 13. The outer peripheries 17 of the side walls 16 lie on respective sides of the outer ring 14 so as to come into contact therewith in the event of the web 15 being damaged.

The sensors 11 are linear variable differential transformers (LVDTs), which are themselves known, and each of which comprises an annular magnetic core 18 that is fastened on the coupling rod 9 and an annular magnetic core 19 that is secured to the cartridge 6. A measurement winding 20 extends around the magnetic core 18 and is connected to connectors 21 leading to the outside of the body 5 for connection via electrical conductors 22 to the control unit 4.

It should be observed that the coupling rod 9 and the cartridge 6 are made of materials that are identical or that present the same coefficient of thermal expansion so as to avoid any differential expansion falsifying the measurements.

The way in which the control unit 4 makes use of the signals that are representative of the relative movement as delivered by the sensors 11 is itself known and is not described in detail herein.

Naturally, the invention is not limited to the embodiment described and covers any variant coming within the ambit of the invention as defined by the claims.

The link could have only one sensor or it could have two sensors located at the same end, or it could have one sensor at each end, or indeed it could have three sensors or more than four.

The housing 8 may be formed directly in the body 5.

The cartridge 6 may be fastened in the body 5 in some other way, e.g. along its entire length.

Other applications of the control system may be envisaged, for example controlling the steering members of a wheeled vehicle or watercraft.

The invention claimed is:

1. A control system comprising:
a linkage with a force-transmission link,
wherein the link comprises a body extending along a longitudinal axis and having two cartridges each defining an end housing slidably receiving a coupling rod for coupling the link to an adjacent element of the linkage, and each cartridge receiving at least one sensor,
each cartridge is closed by a respective elastically-deformable test member which is deformed along said longitudinal axis,
wherein a respective rod passes through each elastically-deformable test member,
wherein each elastically-deformable test member has an inner periphery fastened to the respective rod and an outer periphery fastened to a wall defining the respective cartridge, and
wherein each cartridge receives at least one sensor for sensing relative movement between the respective rod and the body.

2. The system according to claim 1, wherein each elastically-deformable test member comprises an inner ring coaxially inside an outer ring and connected together by an elastically deformable annular web , the inner ring being mounted on the respective rod and the outer ring being mounted in the wall of the respective cartridge.

3. The system according to claim 1, wherein the at least one sensor comprises a linear variable differential transformer having at least one winding fastened to the respective rod or to the wall of the respective cartridge and a core fastened to the wall of the respective cartridge or to the respective rod.

4. The system according to claim 1, wherein each cartridge receives at least two sensors.

5. The system according to claim 2, wherein each elastically-deformable test member includes at least one rigid annular wall extending parallel to the web and having an outer periphery forming a lateral abutment against relative movement between the outer ring and the inner ring.

6. The system according to claim 2, wherein each cartridge is received with radial clearance in a cavity formed in one of the ends of the body, and has one end fastened to the body in the vicinity of the respective elastically-deformable.

7. The system according to claim 5, wherein each elastically-deformable test member has two rigid annular walls extending on either side of the web.

* * * * *